United States Patent
Suzuki et al.

(10) Patent No.: US 9,300,765 B2
(45) Date of Patent: Mar. 29, 2016

(54) EXCHANGE OF INFORMATION BETWEEN PROCESSING SERVERS

(71) Applicant: International Business Machines Corporation, Armonk, NY (US)

(72) Inventors: Takako Suzuki, Tokyo (JP); Jingyang Zhao, Chiba (JP)

(73) Assignee: International Business Machines Corporation, Armonk, NY (US)

(*) Notice: Subject to any disclaimer, the term of this patent is extended or adjusted under 35 U.S.C. 154(b) by 404 days.

(21) Appl. No.: 13/897,705

(22) Filed: May 20, 2013

(65) Prior Publication Data

US 2013/0332579 A1 Dec. 12, 2013

(30) Foreign Application Priority Data

Jun. 29, 2012 (JP) ................. 2012-147784

(51) Int. Cl.
*G06F 15/16* (2006.01)
*H04L 29/06* (2006.01)

(52) U.S. Cl.
CPC ..................... *H04L 69/08* (2013.01)

(58) Field of Classification Search
CPC ..... H04W 80/04; H04W 88/06; H04W 28/10; H04L 12/66; H04L 29/06027; H04L 69/08
USPC ................................. 709/219, 203
See application file for complete search history.

(56) References Cited

U.S. PATENT DOCUMENTS

| | | | | |
|---|---|---|---|---|
| 6,836,795 B2 * | 12/2004 | Soderberg | ........... | H04L 63/0428 709/223 |
| 7,478,395 B2 * | 1/2009 | Bjare | ........... | G06F 8/34 719/311 |
| 7,996,488 B1 * | 8/2011 | Casabella | ........... | G06F 9/5038 709/217 |
| 2005/0228906 A1 * | 10/2005 | Kubota | ........... | H04L 29/06 710/1 |
| 2008/0183479 A1 * | 7/2008 | Iwashita | ........... | G06Q 10/10 705/1.1 |
| 2010/0125624 A1 * | 5/2010 | Bachhuber-Haller | ........... | G06F 9/542 709/202 |
| 2012/0210335 A1 * | 8/2012 | Salt | ........... | G06F 9/541 719/315 |

FOREIGN PATENT DOCUMENTS

| | | |
|---|---|---|
| JP | 07054505 | 6/1995 |
| JP | 10049471 | 2/1998 |
| JP | 2002312183 | 10/2002 |
| JP | 2010009218 | 1/2010 |
| JP | 2010524072 | 7/2010 |
| JP | 2010262571 | 11/2010 |

* cited by examiner

*Primary Examiner* — Duyen Doan
(74) *Attorney, Agent, or Firm* — Schmeiser, Olsen & Watts, LLP; John Pivnichny

(57) ABSTRACT

A method and system for exchanging information between processing servers. Both a processing request for a processing of data and a first key identifying the processing of data are received at an Enterprise Service Bus (ESB) server from a first application server. In response to receiving both the processing request and the first key, the processing request and a second key are sent from the ESB server to a second application server. The second key differs from the first key. After sending the processing request and the second key to the second application server, an acceptance response indicating that the processing request has been accepted by the second server is received by the ESB server from the second application server. In response to receiving the acceptance response from the second application server, the acceptance response is sent by the ESB server to the first application server.

20 Claims, 7 Drawing Sheets

EXCHANGE OF INFORMATION BETWEEN PROCESSING SERVERS

TECHNICAL FIELD

The present invention relates to a system, service, and method for supporting integration between information processing systems.

BACKGROUND

A plurality of servers is connected, and processing is performed cooperatively to provide a service. The information processing system for each server constituting such a system is not necessarily limited to processing performed using common specifications. In order to facilitate integration in an information processing system, a mechanism has been provided to accommodate specification differences in the information processing systems of servers such as Enterprise Service Bus (ESB) and Enterprise Application Integration (EAI).

Integration middleware such as ESB and EAI implements features such as message format conversion, protocol conversion, and routing processing. Through the intermediation of such middleware, connections can be established and cooperative operations performed without being aware of the fact, even when each information processing system uses different message formats and protocols.

When a plurality of information processing systems is attempting to work together, each system may not only have a different message format and protocol, but also a different processing method (communication method). For example, one information processing system may use a polling method, and another information processing system may use a callback method. Because these two systems cannot exchange information, the differences between the processing methods have to be resolved.

However, changing system configurations to accommodate the processing method of another information processing system in order to cooperate with that system is costly. Because logic for converting processing methods is installed in addition to the logic related to the operation of the original system, the processing performed by the system itself becomes more complicated.

When an information processing system is developed, compatibility with other information processing systems has to be taken into account, and the system has to be designed to accommodate other processing methods. This increases the amount of time required for system development, and reduces development efficiency.

BRIEF SUMMARY

The present invention provides a method for exchanging information between processing servers, said method comprising:

receiving, by a computer processor at an Enterprise Service Bus (ESB) server from a first application server, both a processing request for a processing of data and a first key identifying the processing of data;

in response to said receiving both the processing request and the first key, said processor sending the processing request and a second key to a second application server, said second key differing from the first key;

after said sending the processing request and the second key to the second application server, said processor receiving from the second application server an acceptance response indicating that the processing request has been accepted by the second server; and in response to said receiving the acceptance response from the second application server, said processor sending the acceptance response to the first application server.

The present invention provides a computer system comprising a computer processor at an Enterprise Service Bus (ESB) server, a memory coupled to the processor, and a computer readable storage device coupled to the processor, said storage device containing program code which, upon being executed by the processor, implements a method for exchanging information between processing servers, said method comprising:

said processor receiving both a processing request for a processing of data and a first key identifying the processing of data;

in response to said receiving both the processing request and the first key, said processor sending the processing request and a second key to a second application server, said second key differing from the first key;

after said sending the processing request and the second key to the second application server, said processor receiving from the second application server an acceptance response indicating that the processing request has been accepted by the second server; and in response to said receiving the acceptance response from the second application server, said processor sending the acceptance response to the first application server.

The present invention provides a computer program product, comprising a computer readable storage device having computer readable program code stored therein, said program code containing instructions which, upon being executed by a computer processor at an Enterprise Service Bus (ESB) server, implement a method for exchanging information between processing servers, said method comprising:

said processor receiving both a processing request for a processing of data and a first key identifying the processing of data;

in response to said receiving both the processing request and the first key, said processor sending the processing request and a second key to a second application server, said second key differing from the first key;

after said sending the processing request and the second key to the second application server, said processor receiving from the second application server an acceptance response indicating that the processing request has been accepted by the second server; and in response to said receiving the acceptance response from the second application server, said processor sending the acceptance response to the first application server.

DETAILED DESCRIPTION

Figure 1:
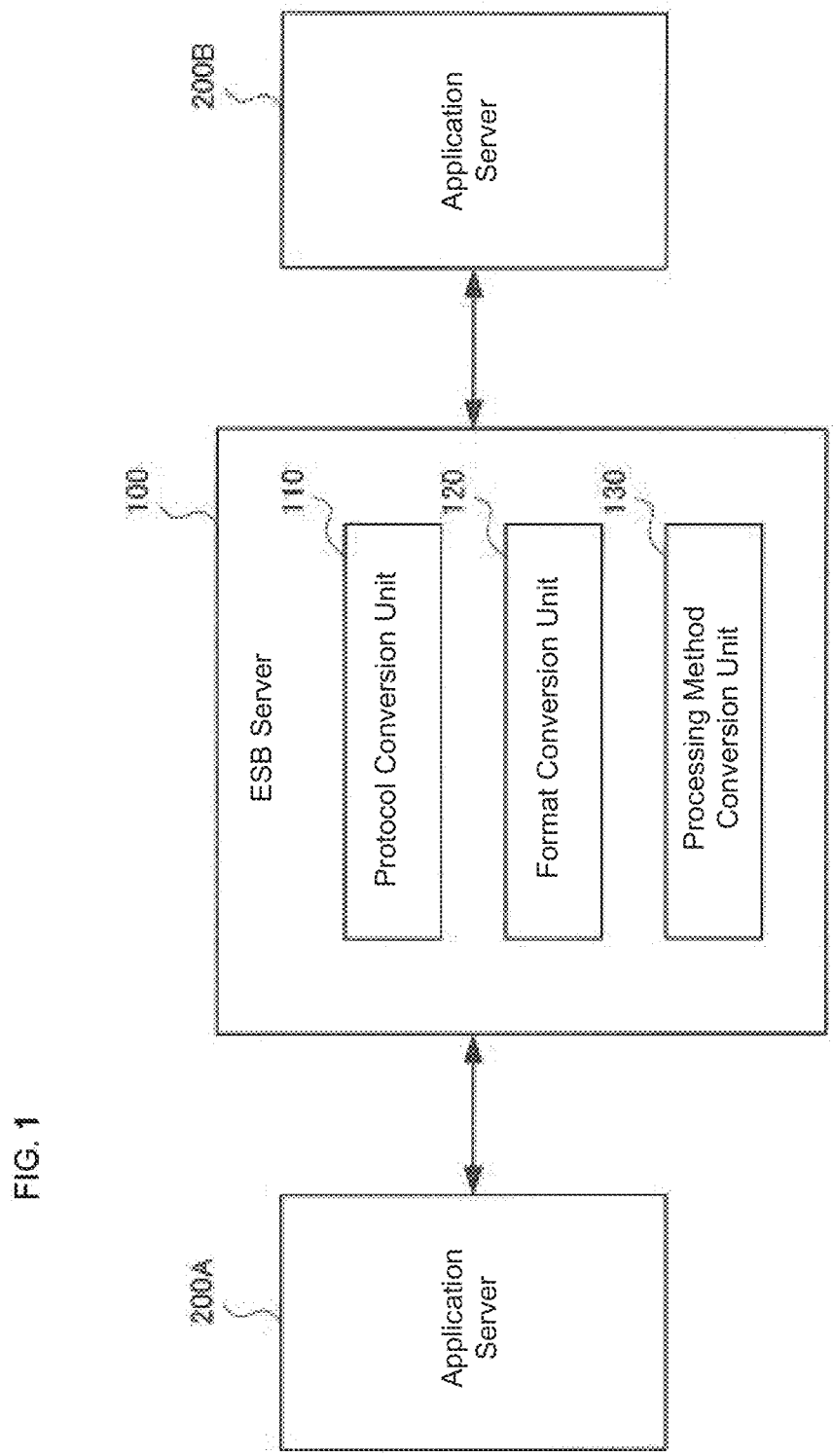
FIG. 1 is a diagram showing a configurational example of an integration support system, in accordance with embodiments of the present invention.

The present invention realizes a system, service, and method for supporting integration between information processing systems by accommodating differences in processing methods during the exchange of information between information processing systems.

The present invention can be implemented as a system that includes a first information processing device for sending a processing request to an outside system to request execution of data processing, for sending a result request to acquire the results of the data processing, and to receive a result response including the processing results; a second information processing device for receiving a processing request from the first information processing device, for executing data processing in response to the processing request, and for returning the processing results; and an integration supporting device for supporting integration between the first information processing device and the second information processing device.

The first information processing device sends requested processing identification information identifying the data processing in the processing request, along with the processing request and the result request, to the integration supporting device.

The integration supporting device includes a communication unit for exchanging data with the first information processing device and the second information processing device; an association processing unit for associating the processing request, and result request with the processing results; and a storage unit for storing the processing results acquired from the second information processing device.

The association processing unit associates the processing results received from the second information processing device with the processing request from the first information processing device, and the received request processing identification information, and storing the associated information in the storage unit; identifies the processing results associated with the requested processing identification information among the processing results stored in the storage unit based on the result request and the requested processing identification information received from the first information processing device; and sends the identified processing results to the first information processing device via the communication unit.

More specifically, the association processing unit of the integration supporting device assigns to the processing request received from the first processing device the executed processing identification information for identifying the data processing executed by the second processing device based on the processing request; sends the processing request and the executed processing identification information to the second information processing device via the communication unit; associates the processing request from the first information processing device, the received requested processing identification information, and the executed processing identification information; and stores the associated information in the storage unit, identifies the requested processing identification information associated with the executed processing identification information based on the processing results from the second information processing device for the data processing based on the processing request, and the received executed processing identification information, associates the identified requested processing identification information, the executed processing identification, and the processing results, and stores the associated information in the storage unit.

The cooperating supporting device notifies the first information processing device of no processing results when a results request and requested processing identification information are received from the first information processing device, and processing results associated with the requested processing identification information have not been stored in the storage unit.

The present invention can be a method for supporting integration between a first information processing device requesting the execution of data processing by an outside system and a second information processing device for executing the data processing. This method includes having a integration support device relay data communication between the first information processing device and the second information processing device; sends a processing request received from the first processing device to the second information processing device requesting the execution of data processing by the second information processing device; associates the processing results of the data processing based on the processing request received from the second information processing device to the requested processing identification information for identifying the data processing in the processing request and received, along with the processing request, from the first information processing device, and store the associated information in a storage device; identifies the processing results associated with the requested processing identification information among the processing results stored in the storage unit based on the result request for acquiring processing results of the data processing from the first information processing device, and on the received requested processing identification information; and sends the identified processing results to the first information processing device.

The present invention can also be realized as program code for controlling a computer to implement each function in the system described above, or as program code for controlling a computer to execute processing corresponding to each step in the methods of the present invention. This program code can be stored on a magnetic disk (e.g., magnetic disk device 101c in FIG. 7), optical disk, semiconductor memory or other hardware storage device.

The present invention can support integration between information storage systems by accommodating differences in processing methods during the exchange of information between information processing systems.

In the present invention, the integration support system for supporting integration between a plurality of information processing systems may be configured as an Enterprise Service Bus (ESB) system.

FIG. 1 is a diagram showing a configurational example of an integration support system, in accordance with embodiments of the present invention.

In the integration support system of the present invention, as shown in FIG. 1, a plurality of application servers 200 are connected via an ESB server 100 functioning as the integration support device. In the example shown in the drawing, two application servers 200A and 200B are connected to the ESB server 100. However, this was done only to facilitate explanation of the present invention. Three or more application servers can be connected to the ESB server 100. Each application server may function as an information processing system.

The ESB server 100 relates data communication between application server 200A and application server 200B. As shown in FIG. 1, the ESB server 100 includes a protocol conversion unit 110 and a format conversion unit 120 to provide protocol and data format conversion functions typical of ESB, respectively. The ESB server 100 in the present invention also has a processing method conversion unit 130 to address the difference in processing methods between application server 200A and application server 200B.

In the configuration shown in FIG. 1, the application server 200A is the requesting device (first information processing device) making a request of an outside system to execute data processing. Application server 200B is the executing device (second information processing device) executing data processing based on a request from application server 200A. In the present invention, a web application has been installed in the application server 200A which uses the polling method as the processing method for exchanging information. Meanwhile, application server 200B performs data processing based on requests from other devices and responds by sending back processing results. It uses the callback method as its processing method.

During data communication using the polling method, the receiving device (application server 200A) contacts the sending device (application server 200B) to determine whether or not there is data to be sent. When there is data to be sent, the data is sent from the sending device 200B to the receiving device 200A. The sending device 200B does not know when it will be queried by a receiving device 200A. Therefore, the sending device 200B requires a means for permanently storing data to be sent until the sending device 200B is queried by the receiving device 200A.

In data communication using the callback method, the receiving device 200A awaits a response from the sending device 200B after the receiving device 200A has accessed the sending device 200B and has sent a request. The sending device 200B then replies to the received request, and sends a response to the receiving device 200A as soon as possible. Therefore, the receiving device 200A requires a means for always accepting a response from a sending device.

Figure 2:
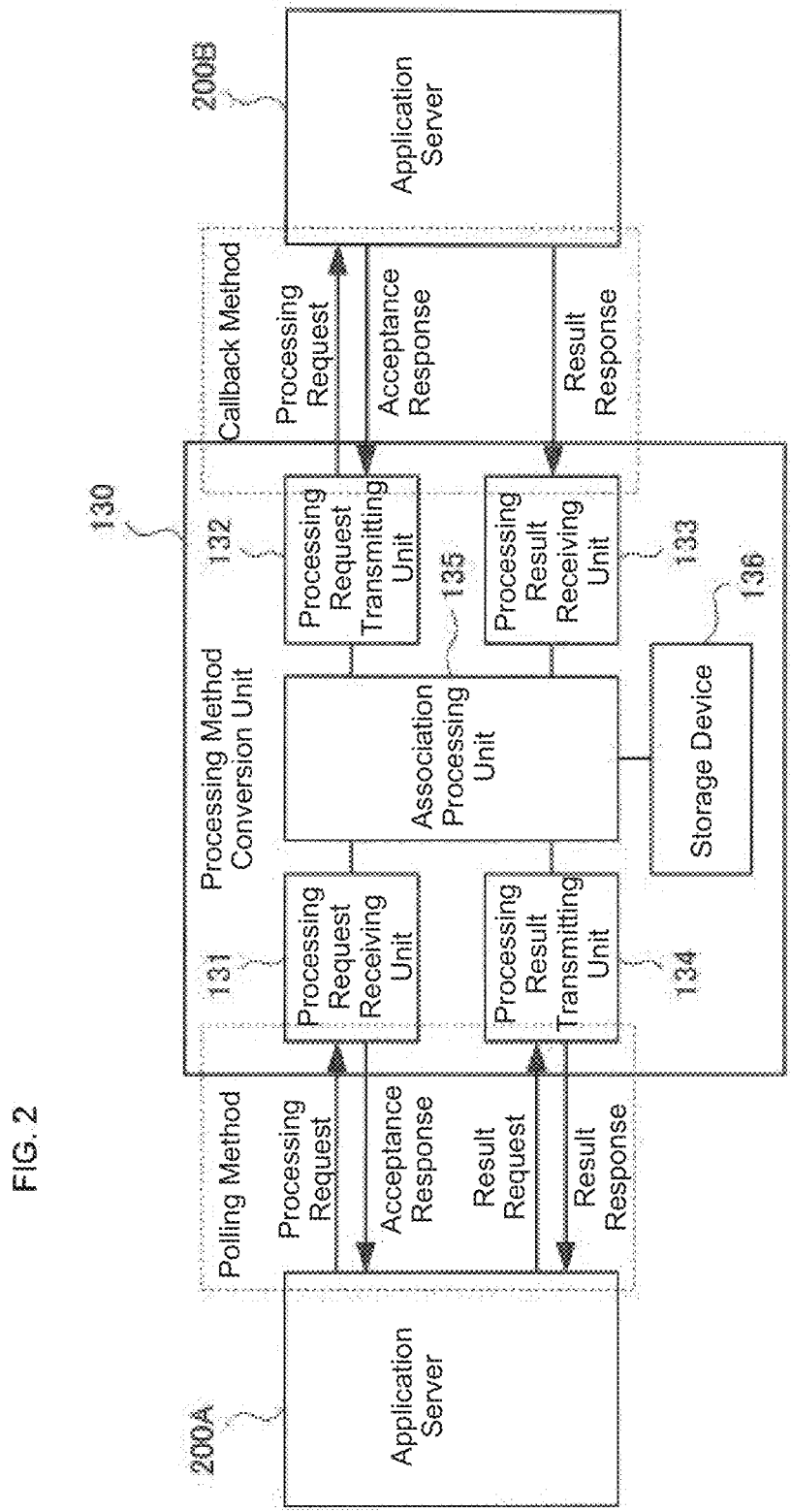
FIG. 2 is a diagram showing a function configurational example of a processing method conversion unit in the integration support system of FIG. 1, in accordance with embodiments of the present invention.

FIG. 2 is a diagram showing a function configurational example of the processing method conversion unit 130 of FIG. 1, in accordance with embodiments of the present invention.

As shown in FIG. 2, the processing method conversion unit 130 of the present invention has a processing request receiving unit 131, a processing request transmitting unit 132, a processing result receiving unit 133, and a processing result transmitting unit 134 functioning as communication means for exchanging data with the application servers 200A and 200B. The processing method conversion unit 130 also has an association processing unit 135 for associating data communication related to the same process, and a storage device (storage unit) 136.

The processing request receiving unit 131 is a communication means used when a processing request is being made of application server 200B by application server 200A, and receives requests transmitted by the application server 200A. Also, the processing request receiving unit 131 acquires a request-acceptance response from application server 200B and sends this request-acceptance response to application server 200A.

The processing request transmitting unit 132 is a communication means used when a processing request is being made of application server 200B by application server 200A, and transmits requests received by the processing request receiving unit 131 to application server 200B. An acceptance response from application server 200B is also acquired.

The processing result receiving unit 133 is a communication means used when a response is made to application server 200A from application server 200B. Processing result receiving unit 133 receives a results response from application server 200B.

The processing result transmitting unit 134 is a communication means used when a response is made to application server 200A from application server 200B. Processing result transmitting unit 134 receives a result request from application server 200A and sends a result response acquired from application server 200B to application server 200A.

In the present embodiment, when transmitting processing requests and result requests, the application server 200A transmits key data (called "key A" below), which is request processing identification information for identifying the processing related to a processing request, in addition to these requests. Therefore, the processing request receiving unit 131 also receives key A when a processing request is received. Also, the processing result transmitting unit 134 also receives key A when a results request is received. In this way, it can be determined that a processing request and result request including the same key A are a processing request and result request related to the same processing. Because key A is information identifying a processing request, unique data is assigned to key A each time application server 200A performs a processing request.

In the present embodiment, key data (called "key B" below) is transmitted along with a processing request from the ESB server 100 to application server 200B as execution processing identification information for identifying the processing executed by application server 200B. Application server 200B sets key B received along with the processing request when sending a result response including processing results to the ESB server 100. Therefore, the processing request transmitting unit 132 also sends key B when sending a processing request. The processing result receiving unit 133 also receives key B when receiving a result response. Here, key B is information used to identify each process corresponding to a processing request. Therefore, unique data is assigned to key B each time.

The association processing unit 135 associates communication performed with application server 200A to communication performed with application server 200B. More specifically, by associating key A acquired from application server 200A with key B added to a processing request sent to application server 200B, communication between the ESB server 100 and application server 200A can be associated with communication between the ESB server 100 and application server 200B. By associating a processing request acquired from application server 200A with both key A and key B, result requests and processing results received along with the same key A can be associated. The following is a detailed explanation of the processing performed by the processing method conversion unit 130 including the association processing unit 135.

The storage device 136 stores information associated by the association processing unit 135, key A, key B, and processing results acquired from application server 200B. This storage device 136 can be a non-volatile storage device, and at least stores the information related to a processing request until the ESB server 100 receives a result request to acquire processing results from application server 200B.

Figure 3:
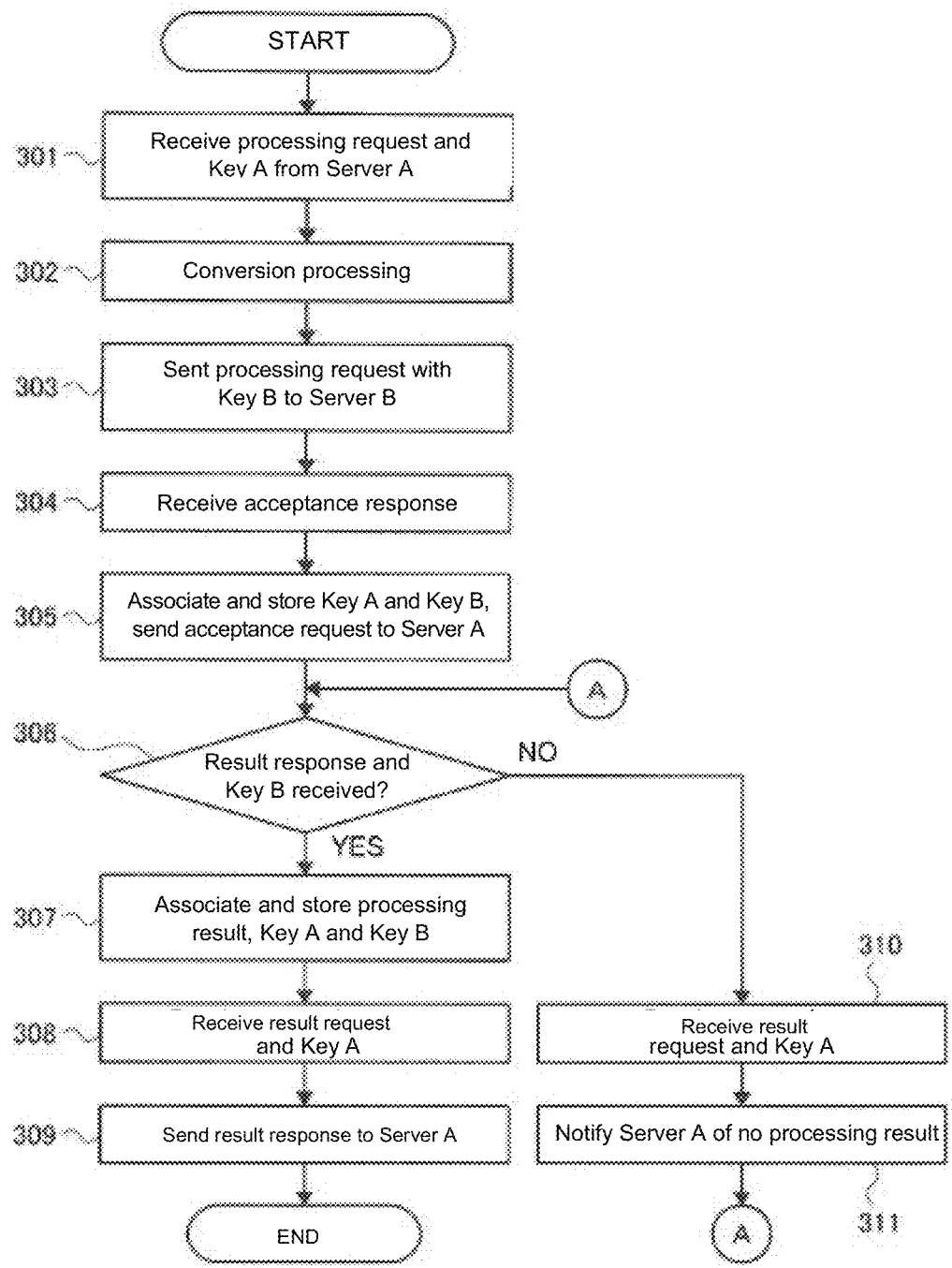
FIG. 3 is a flowchart showing the processing steps performed by the processing method conversion unit of FIGS. 1 and 2, in accordance with embodiments of the present invention.
Figure 4:
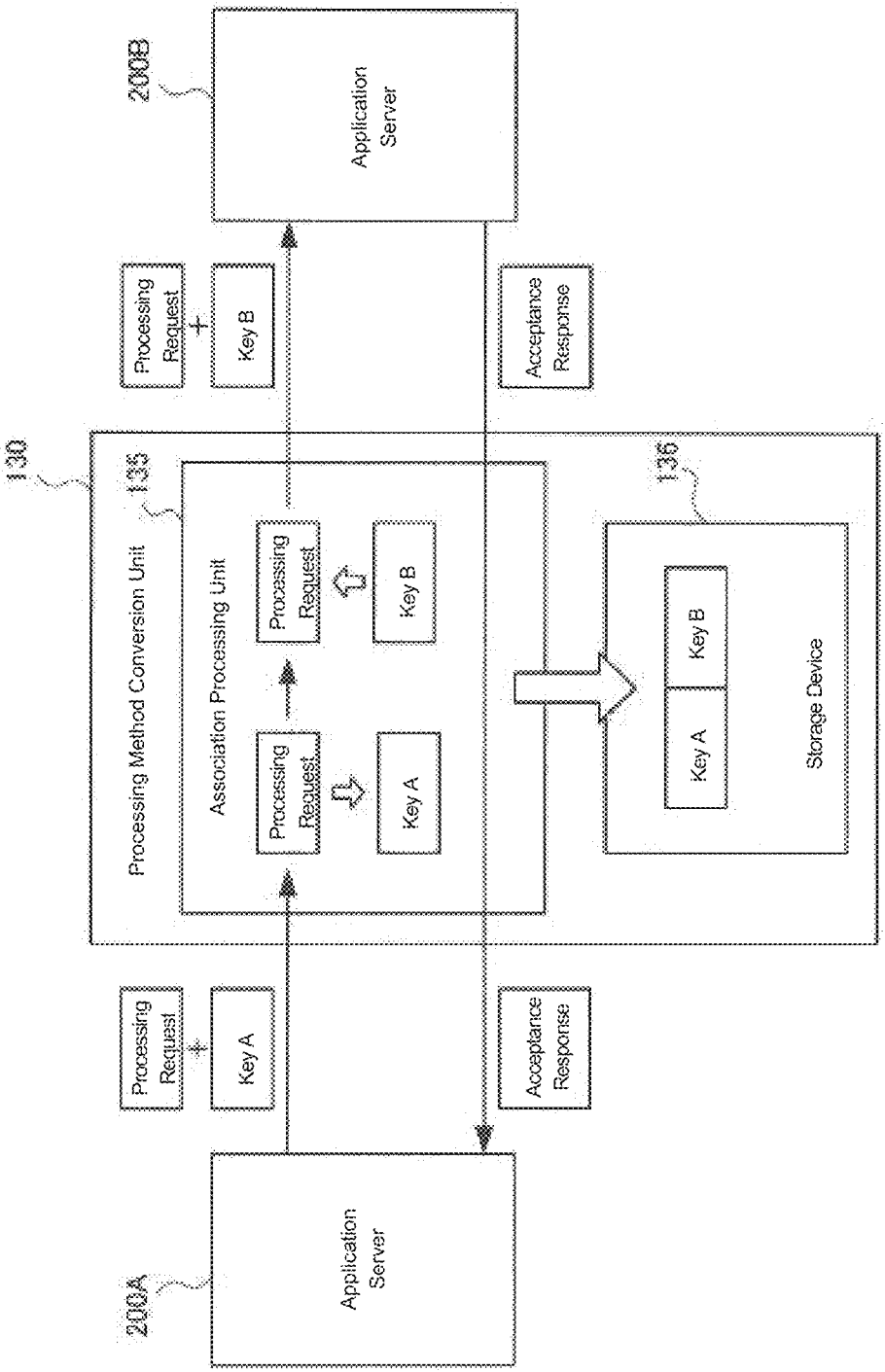
FIG. 4 is a diagram showing the flow of data when a processing request has been made, in accordance with embodiments of the present invention.
Figure 5:
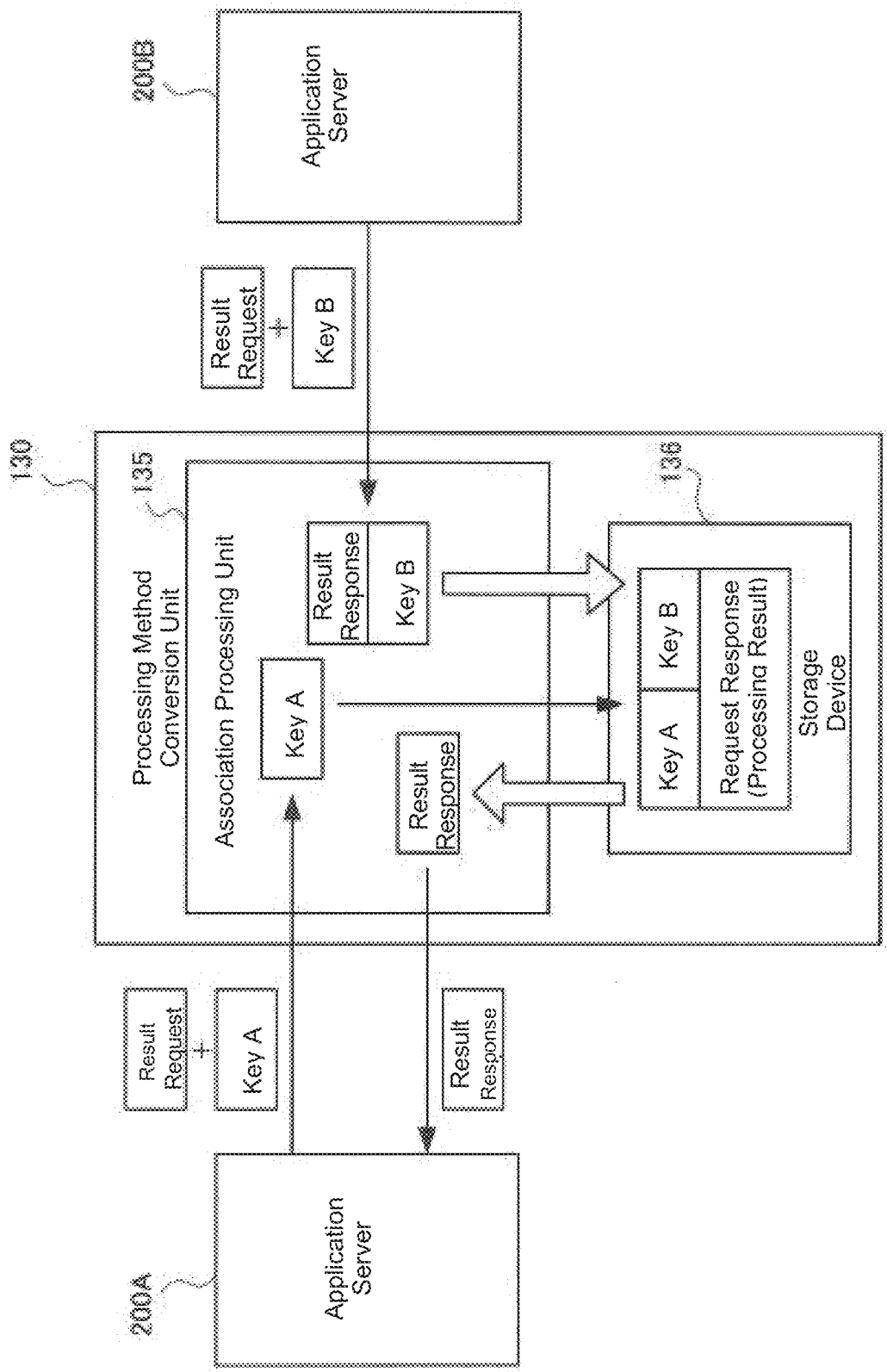
FIG. 5 is a diagram showing the flow of data when a result response has been made, in accordance with embodiments of the present invention.

FIG. 3 is a flowchart showing the processing steps performed by the processing method conversion unit of FIGS. 1 and 2, in accordance with embodiment s of the present invention. FIG. 4 is a diagram showing the flow of data when a processing request for a processing of data has been made, in accordance with embodiments of the present invention. FIG. 5 is a diagram showing the flow of data when a result response has been made, in accordance with embodiments of the present invention. The following is a detailed explanation of the processing method conversion process in the present invention with reference to FIGS. 3, 4, and 5. In FIG. 3, application server 200A is "server A", and application server 200B is "server B".

First, in order to have application server 200B execute the desired processing, application server 200A sends a processing request for application server 200B, along with key A identifying the processing, to the ESB server 100. After the ESB server 100 receives the processing request and key A from application server 200A (step 301), conversions are performed on the processing request using the protocol conversion unit 110, the format conversion unit 120, and the processing method conversion unit 130 (step 302). While the specific details are not described here, the protocol and data format of the processing request are converted by the protocol conversion unit 110 and the format conversion unit 120, respectively, so that the protocol and data format can be handled by application server 200B.

Next, the association processing unit 135 in the processing method conversion unit 130 adds key B, which differs from key A, to the processing request, and the ESB server 100 sends the processing request and key B to application server 200B (step 303). Key B can be generated anew each time a processing request is received, or it can be selected from a prepared data group.

When a processing request has been received by application server 200B, application server 200B first replies to the ESB server 100 with an acceptance response indicating that the processing request has been accepted.

When the ESB server 100 receives the acceptance response from application server 200B (step 304), the association processing unit 135 in the processing method conversion unit 130 associates key A acquired in step 301 with key B added to the processing request in step 303, and stores key A, key B, and the association of key A with key B in the storage device 136, and then sends the acquired acceptance response to the application server 200A initiating the processing request (step 305). The processing of the processing request ends with step 305.

Referring to FIG. 4, the processing request and key A are sent from application server 200A to the ESB server 100, and key B is added to the processing request by the ESB server 100. Then, the processing request and key B are sent to application server 200B. When the processing request has been received by application server 200B, an acceptance response is sent from application server 200B to the ESB server 100, and the acceptance response is sent from the ESB server 100 to application server 200A. Key B does not have to be added to the acceptance response. Also, key A and key B are associated, and the association of key A with key B is stored. In this way, the processing response identified by key A is associated with the processing identified by key B.

Next, when the requested processing has been completed by application server 200B and processing results have been obtained, application server 200B adds key B acquired in step 303 to the result response including the obtained processing results, and the key B and the result response are sent to the ESB server 100.

When the ESB server 100 has received the result response and key B from application server 200B (Yes in step 306), key A associated with the received key B is detected by the association processing unit 135 in the processing method conversion unit 130, and key A, key B, and the received result response (or processing results including the result response) are associated with one another. Key A, key B, the received result response, and the association among key A, key B, and the received result response, are stored in the storage device 136 (step 307).

Next, after the result response has been received by the ESB server 100, application server 200A sends, along with key A, a result request to acquire the processing results from the ESB server 100 on the predetermined timing.

When the ESB server 100 has received a result request and key A from application server 200A (step 308), the association processing unit 135 in the processing method conversion unit 130 uses received key A to retrieve the result response (processing results) associated with key A. The ESB server 100 then sends the result response including the processing results associated with the identified key A to application server 200A (step 309).

When the ESB server 100 receives a result request and key A from application server 200A (No in step 306, step 310) before a result response and key B have been received by the ESB server 100 from application server 200B, the ESB server 100 cannot send a result response to application server 200A because processing results corresponding to key A have not been stored in the storage device 136. Therefore, the ESB server 100 notifies application server 200A that there is no available result response to send to the application server 200A (step 311), after which the method loops back to step 306 to perform another iteration through steps 306, 310, and 311 or a pass through steps 306-309. Iterations through steps 306, 310, and 311 will be successively performed until the YES branch from step 306 is executed. The processing of the method of FIG. 3 ends with step 309.

Referring to FIG. 5, the result response and key B are sent from application server 200B to the ESB server 100, and key A, key B and the result response (processing results) are associated and stored. When the result request and key A are sent from application server 200A to the ESB server 100, the corresponding processing results are identified based on key A, and the result response is sent from the ESB server 100 to application server 200A.

In the present invention, as explained above, processing results sent from application server 200B can be stored in the ESB server 100, and the processing results can be sent back to application server 200A in response to a result request from application server 200A. As a result, differences in processing methods can be accommodated and integration processing performed even when, as mentioned above, the application server 200A initiating a processing request uses the polling method as its processing method, and the application server 200B executing the processing uses the callback method as its processing method.

In the explanation of this system configuration, the processing method used by application server 200A was the polling method, and the processing method used by the server 200B was the callback method. However, the configuration used to embody the integration support system in the present embodiment is not limited to this situation. For example, the integration support system in the present embodiment can be used even when delayed responses are performed with the Message Queuing (MQ) protocol used by WebSphere® MQ (WebSphere is a trademark of International Business Machines Corporation).

Figure 6:
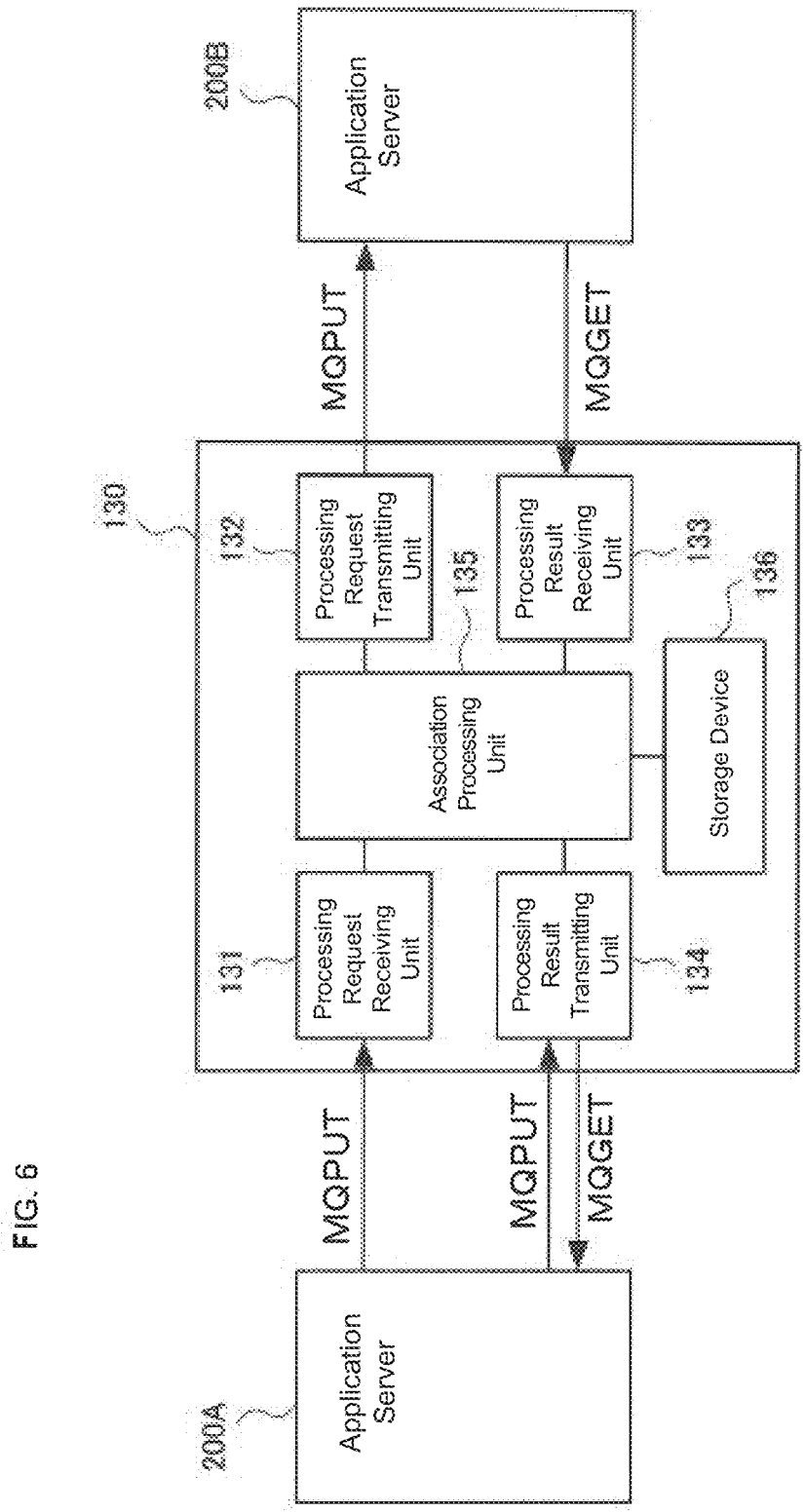
FIG. 6 is a diagram showing a function configurational example when the Message Queuing (MQ) protocol has been applied to the processing method conversion unit of FIGS. 1 and 2, in accordance with embodiments of the present invention.

FIG. 6 is a diagram showing a function configurational example when the MQ protocol has been applied to the processing method conversion unit 130 of FIGS. 1 and 2, in accordance with embodiments of the present invention. In the example shown in FIG. 6, the MQ protocol delayed response request is performed by application server 200A as the initiator of the original processing request. First, application server 200A sends an MQPUT instruction as a processing request, along with key A, to the ESB server 100. The ESB server 100 sends the MQPUT instruction and key B to application server 200B on the basis of the received MQPUT instruction. Then, the ESB server 100 associates received key A with key B appended to the MQPUT instruction, and stores the associated information.

Also, the ESB server 100 sends an MQGET instruction for acquiring processing results to application server 200B to acquire the processing results. At this time, the application server 200B appends key B received along with the MQPUT instruction to the processing results, and sends them back. The ESB server 100 associates key A, key B and the processing results, on the basis of key B received along with the processing results, and stores the associated information.

Next, application server 200A sends the MQPUT instruction as a delayed response request and key A to the ESB server 100. The ESB server 100 identifies the processing results associated with key A on the basis of key A received along with the MQPUT instruction. Afterwards, application server 200A sends the MQGET instruction and key A to the ESB server 100 to acquire the processing results, and acquires the processing results identified by key A.

As explained above, the present invention is thus able to support integration between a requesting device and an executing device in a situation in which the information processing device requesting processing (the requesting device) and the information processing device executing the processing based on the request (the executing device) use different processing methods to exchange information, and in which the timing used by the executing device to return processing results does not match the timing used by the receiving device to acquire processing results.

In this example, the ESB server 100 assigned key B to processing requests and the like, and this key B was prepared separately from key A transmitted by application server 200A, and transmitted this key to application server 200B. In one embodiment, key A and key B are different keys. However, key A acquired from application server 200A can also be used as key B, considering the fact that it is used to identify a processing request by application server 200A and to associate a processing request with processing results. However, in this case, the ESB server 100 has to verify that key A is unique key data for identifying processing or (the results of processing). When key A is used as key B in this manner, processing results corresponding to a processing request are identified based on key A received along with the request response from application server 200B, and on key A received along with the result request from application server 200A when a result request has been received.

A computer hardware configuration suitable for realizing the ESB server 100 in the present embodiment will now be explained.

Figure 7:
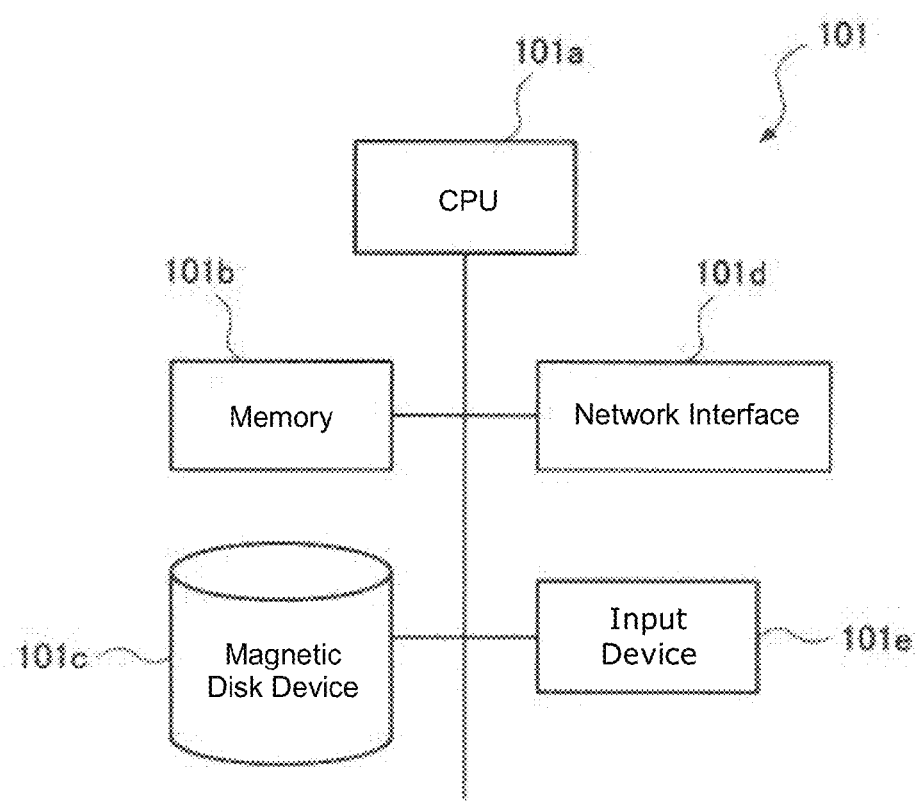
FIG. 7 is a diagram showing an example of a hardware configuration for a computer used to realize an ESB server, in accordance with embodiments of the present invention.

FIG. 7 is a diagram showing an example of a hardware configuration for a computer used to realize the ESB server 100, in accordance with embodiments of the present invention.

The computer 101 shown in FIG. 7 includes a central processing unit (CPU) 101a as a computing means, and memory 101b as a main memory means. The external devices include a magnetic disk drive (HDD: Hard Disk Drive) 101c, a network interface 101d, and an input device 101e. In FIG. 7, the operating system and application software program are stored in the magnetic disk device 101c. By loading these programs into memory 101b and executing them with the CPU 101a, each of the functions included in the ESB server 100 of the present embodiment can be realized.

The computer 101, which may represent or may be comprised by a computer system, includes the computer processor (i.e., CPU 101a), the memory 101b coupled to the processor, and a computer readable hardware storage device (e.g., magnetic disk device 101c, optical disk, semiconductor memory, etc.) coupled to the processor, wherein the storage device contains program code which, upon being executed by the processor via the memory, implements the methods of the present invention.

A computer program product of the present invention comprises a computer readable hardware storage device (e.g., magnetic disk device 101c, optical disk, semiconductor memory, etc.) having computer readable program code stored therein. The program code contains instructions which, upon being executed by the processor (i.e., CPU 101a), implements the methods of the present invention.

In the ESB server 100 shown in FIG. 1 and FIG. 2, the CPU 101a executes the program to realize the functions of the protocol conversion unit 110, the format conversion unit 120, and the association processing unit 135 of the processing method conversion unit 130. The processing request receiving unit 131, the processing request transmitting unit 132, the processing result receiving unit 133 and the processing result transmitting unit 134 are realized by controls performed by the CPU 101a, and functions of the network interface 101d. Also, the storage device 136 is realized by the memory 101b and the magnetic disk device 101c. Note that FIG. 7 is merely an example of a computer hardware configuration suitable for use in the present embodiment. The present embodiment can be applied to a wide variety of information processing systems used as servers, and the present invention can be realized using configurations other than the one shown in the drawing.

In the explanation of the present embodiment, an ESB server 100 was used as an integration support device to support integration between application server 200A acting as a requesting device and application server 200B acting as an executing device. However, a configuration other than an ESB server 100 can be used as long as the timing used by the requesting device and the timing used by the executing device to exchange processing results do not match.

A system denoted by the system of FIG. 7, or its equivalent, may be utilized to implement methods of the present invention by ESB server 100, application server 200A, application server 200B, or any other application server of the present invention.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for exchanging information between processing servers, said method comprising:
   receiving, by a computer processor at an Enterprise Service Bus (ESB) server from a first application server, a processing request for a processing of data and a first key, said first key identifying the processing of data pertaining to the processing request;
   in response to said receiving the processing request and the first key, said processor sending the processing request and a second key to a second application server, said second key identifying each process in the processing request pertaining to the processing of data to be performed by the second application server, said second key differing from the first key;
   after said sending the processing request and the second key to the second application server, said processor receiving from the second application server an acceptance response indicating that the processing request has been accepted by the second server; and
   in response to said receiving the acceptance response, said processor sending the acceptance response to the first application server.

2. The method of claim 1, said method comprising:
   in further response to said receiving the acceptance response, said processor storing in a storage device of the ESB server: the first key, the second key, and an association of the first key with the second key.

3. The method of claim 1, said method comprising:
   after said sending the acceptance response to the first application server, said processor receiving from the first application server a result request for a result of the processing of data;
   after said receiving the acceptance response from the second application server, said processor receiving from the second application server a result response comprising the result of the processing of data; and
   in response to said receiving both the result request and the result response, said processor sending the result response to the first application server.

4. The method of claim 3, said method comprising:
   before said receiving the result response and after said receiving the result request, said processor notifying the first application server that there is no available result response to send to the first application server.

5. The method of claim 3, said method comprising:
   after said receiving the result response and before said receiving the result request, said processor storing in a storage device of the ESB server: the first key, the second key, the result response, and an association among the first key, the second key, and the result response.

6. The method of claim 5, said method comprising:
   after said sending the acceptance response to the first application server, said processor receiving from the first application server the first key along with the result request;
   after said receiving both the result request and the result response and before said sending the result response to the first application server, said processor using the first key received along with the result request to retrieve the result response.

7. The method of claim 3, wherein said receiving the result request occurs before said receiving the result response.

8. A computer system comprising a computer processor at an Enterprise Service Bus (ESB) server, a memory coupled to the processor, and a computer readable storage device coupled to the processor, said storage device containing program code which, upon being executed by the processor, implements a method for exchanging information between processing servers, said method comprising:
   receiving, by a computer processor at an Enterprise Service Bus (ESB) server from a first application server, a processing request for a processing of data and a first key, said first key identifying the processing of data pertaining to the processing request;
   in response to said receiving the processing request and the first key, said processor sending the processing request and a second key to a second application server, said second key identifying each process in the processing request pertaining to the processing of data to be performed by the second application server, said second key differing from the first key;
   after said sending the processing request and the second key to the second application server, said processor receiving from the second application server an acceptance response indicating that the processing request has been accepted by the second server; and
   in response to said receiving the acceptance response, said processor sending the acceptance response to the first application server.

9. The computer system of claim 8, said method comprising:
   in further response to said receiving the acceptance response, said processor storing in a storage device of the ESB server: the first key, the second key, and an association of the first key with the second key.

10. The computer system of claim 8, said method comprising:
    after said sending the acceptance response to the first application server, said processor receiving from the first application server a result request for a result of the processing of data;
    after said receiving the acceptance response from the second application server, said processor receiving from the second application server a result response comprising the result of the processing of data; and
    in response to said receiving both the result request and the result response, said processor sending the result response to the first application server.

11. The computer system of claim 10, said method comprising:
    before said receiving the result response and after said receiving the result request, said processor notifying the first application server that there is no available result response to send to the first application server.

12. The computer system of claim 10, said method comprising:
    after said receiving the result response and before said receiving the result request, said processor storing in a storage device of the ESB server: the first key, the second key, the result response, and an association among the first key, the second key, and the result response.

13. The computer system of claim 12, said method comprising:
    after said sending the acceptance response to the first application server, said processor receiving from the first application server the first key along with the result request;
    after said receiving both the result request and the result response and before said sending the result response to the first application server, said processor using the first key received along with the result request to retrieve the result response.

14. The computer system of claim 10, wherein said receiving the result response occurs before said receiving the result request.

15. A computer program product, comprising a computer readable storage device having computer readable program code stored therein, said program code containing instructions which, upon being executed by a computer processor at an Enterprise Service Bus (ESB) server, implement a method for exchanging information between processing servers, said method comprising:

receiving, by a computer processor at an Enterprise Service Bus (ESB) server from a first application server, a processing request for a processing of data and a first key, said first key identifying the processing of data pertaining to the processing request;

in response to said receiving the processing request and the first key, said processor sending the processing request and a second key to a second application server, said second key identifying each process in the processing request pertaining to the processing of data to be performed by the second application server, said second key differing from the first key;

after said sending the processing request and the second key to the second application server, said processor receiving from the second application server an acceptance response indicating that the processing request has been accepted by the second server; and in response to said receiving the acceptance response, said processor sending the acceptance response to the first application server.

16. The computer program product of claim 15, said method comprising:

in further response to said receiving the acceptance response, said processor storing in a storage device of the ESB server: the first key, the second key, and an association of the first key with the second key.

17. The computer program product of claim 15, said method comprising:

after said sending the acceptance response to the first application server, said processor receiving from the first application server a result request for a result of the processing of data;

after said receiving the acceptance response from the second application server, said processor receiving from the second application server a result response comprising the result of the processing of data; and in response to said receiving both the result request and the result response, said processor sending the result response to the first application server.

18. The computer program product of claim 17, said method comprising:

before said receiving the result response and after said receiving the result request, said processor notifying the first application server that there is no available result response to send to the first application server.

19. The computer program product of claim 17, said method comprising:

after said receiving the result response and before said receiving the result request, said processor storing in a storage device of the ESB server: the first key, the second key, the result response, and an association among the first key, the second key, and the result response.

20. The computer program product of claim 19, said method comprising:

after said sending the acceptance response to the first application server, said processor receiving from the first application server the first key along with the result request;

after said receiving both the result request and the result response and before said sending the result response to the first application server, said processor using the first key received along with the result request to retrieve the result response.

* * * * *